United States Patent [19]

Füssl

[11] 4,382,779
[45] May 10, 1983

[54] REGENERATIVE SHAFT FURNACE FOR BURNING CARBONATE-CONTAINING RAW MATERIALS

[75] Inventor: Erwin Füssl, Zürich, Switzerland

[73] Assignee: Maerz Ofenbau AG, Zürich, Switzerland

[21] Appl. No.: 217,543

[22] Filed: Dec. 17, 1980

[30] Foreign Application Priority Data

Apr. 30, 1980 [CH] Switzerland ............... 3350/80

[51] Int. Cl.³ .................. F27D 7/00; F27D 1/08; C01F 1/00; C01B 14/14
[52] U.S. Cl. ................... 432/25; 423/175; 423/637; 432/96; 432/100
[58] Field of Search ............. 432/24, 25, 79, 95, 432/96, 98, 100; 423/175, 637

[56] References Cited

U.S. PATENT DOCUMENTS 1,495,631  5/1924  Chaudiere .................... 432/98
4,315,735  2/1982  Füssl et al. ................... 432/79

FOREIGN PATENT DOCUMENTS 211214  9/1960  Austria.

Primary Examiner—John J. Camby
Attorney, Agent, or Firm—Toren, McGeady and Stanger

[57] ABSTRACT

A regenerative shaft furnace for burning carbonate-containing raw materials is disclosed having two or more shafts which are interconnected by ducts which operate in an alternate manner and wherein the burned raw material is cooled in the cooling zone of the shafts. Having a displacer in the cooling zone to prevent the reabsorption of carbon dioxide in the fuel gases by the burned material. A method for burning carbonate-containing raw material is also disclosed.

8 Claims, 2 Drawing Figures

REGENERATIVE SHAFT FURNACE FOR BURNING CARBONATE-CONTAINING RAW MATERIALS

BACKGROUND OF THE INVENTION

1. Field of the Invention

The invention relates to a regenerative shaft furnace for burning carbonate-containing raw materials such as limestone, dolomite, magnesite, etc. More particularly, the invention pertains to such furnaces which have two or more shafts interconnected by ducts and, in an alternating manner, one shaft operates as the burning or parallel flow shaft and the other operates as the counterflow shaft, with the burned raw material being cooled in the cooling zone of the shafts.

2. Description of the Prior Art

Furnaces having two or more shafts are used for burning carbonate-containing raw materials for the purpose of expelling the carbon dioxide as disclosed in Austrian Pat. No. 211,214 and the Journal "Zement-Kalk-Gips" No. 6, 1980, pp. 217ff. They have been very satisfactorily used for many years, because they have a low heat consumption and the burned material produced is of very good quality. The shafts of such a furnace are alternately operated as a parallel flow shaft or a counterflow shaft for the purpose of removing the flue gases. In each shaft, there is a preheating zone, a burning zone, and a cooling zone extending in this order from the upper edge of the shaft to the furnace foundation. In operation, the fuel and the combustion air is supplied to only one shaft, namely the parallel flow or burning shaft, but the cooling air or medium is continuously removed by means of a removal mechanism.

In the case of furnaces having large cross-sections which is often due to constructional reasons, it may happen that the $CO_2$-containing flue gases enter the cooling zones at a low temperature. In the case of burned quicklime (CaO), the $CO_2$ is reabsorbed by the quicklime. This leads to a deterioration of the quality of the lime burned in the burning zone and this quality cannot be improved by supplying more fuel at the beginning of the burning zone. Moreover, since the quantity of reabsorbed carbon dioxide is not generally known, such as increased fuel supply can lead to a large amount of heat in the burning zone and consequently to an undesired, harder lime quality and even to block formation. The quantity of reabsorbed carbon dioxide in the burned lime can vary between a few tenths of a percent and 1 to 2 percent. Reabsorbed carbon dioxide is particularly undesirable when burning lime or dolomite for producing sea water magnasite. In this production process, particularly strict requirements are placed on the residual CO content of the burned material, which must be below 0.5% and even below 0.3%.

SUMMARY OF THE INVENTION

I have discovered a regenerative shaft furnace of the two shaft type wherein the reabsorption of carbon dioxide by the burned material from the gases of the burning zone can be reliably avoided in the cooling zones of the shafts.

This problem is accomplished by inserting a displacer into the cooling zone of each shaft.

DETAILED DESCRIPTION OF THE PREFERRED EMBODIMENTS

Figure 1:
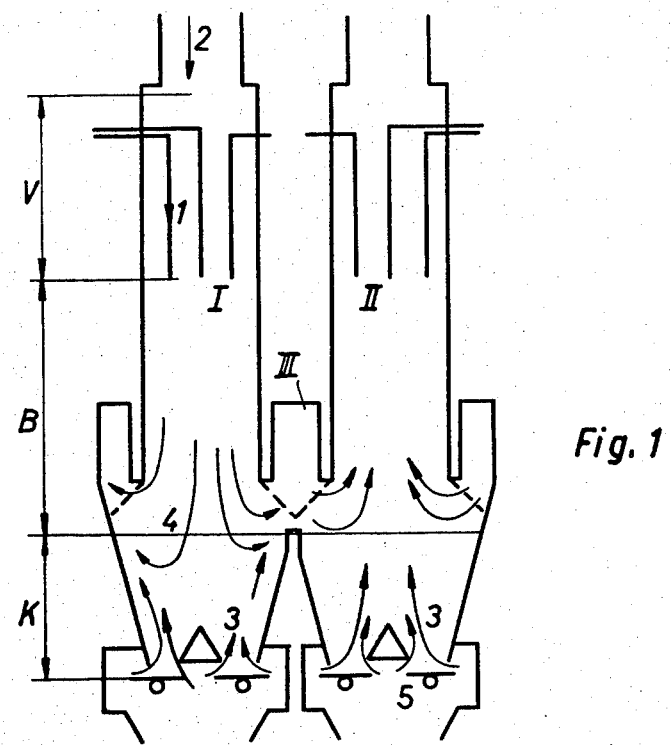
FIG. 1 is a diagrammatic section through a regenerative shaft furnace with two shafts and a cooling zone according to the prior art.

The regenerative shaft furnace diagrammmatically shown in FIG. 1 has two shafts I, II which are interconnected by means of an annular duct III. In the upper part of shafts I and II, fuel lances 1 are arraned over the shaft cross-section and their openings define the end of a preheating zone V in the upper shaft portion.

Preheating zone V is followed by a burning zone B in which the carbon dioxide is expelled from the burned material. The burning zone B is followed by a cooling zone K into which flows a cooling air or some other cooling medium 3. As a result of the combustion of the fuel supplied by the fuel lances 1 with the combustion air 2 entering from the top of the shaft, $CO_2$-containing flue gases 4 are formed, which are transferred from shaft I into the counterflow shaft II and mix with the cooling medium entering through the cooling zones of the two shafts I, II. The burned material is continuously removed from the two shafts I and II by means of a removal mechanism 5.

As a result of the cooling zone construction of the shaft furnace in FIG. 1, it is not possible to prevent $CO_2$-containing flue gases from entering the low temperature ranges, so that the lime quality is reduced. Although this could be corrected by a higher fuel supply, this would lead to other disadvantages, e.g., a harder lime quality or even block formation.

Figure 2:
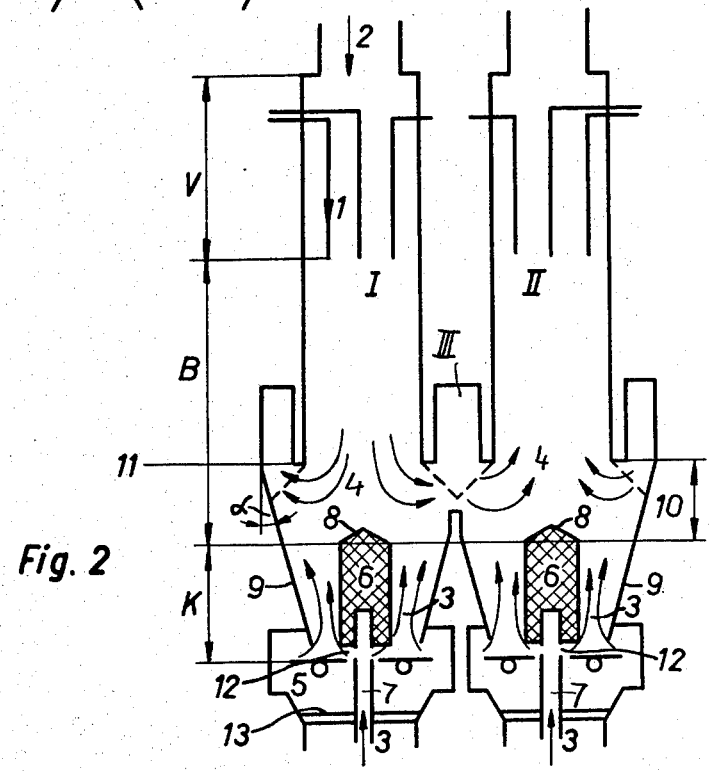
FIG. 2 is a diagrammatic view of a regenerative shaft furnace according to the invention.

It has now surprisingly been found that the entry of the $CO_2$-containing flue gases into the low temperature ranges can be effectively prevented if the cooling zone K is constructed according to FIG. 2. As shown therein, an elongated displacer 6 is arranged in cooling zone K and its upper face 8 extends to the lower end of the brickwork 11 of burning zone B, except for a gap 10. This reliably prevents the $CO_2$-containing flue gases from penetrating the temperature range of the cooling zone K of below approximately 840° C., relative to the burned material. Displacer 6, which is advantageously carried by a steel pipe 7 used for supplying the cooling medium is shaped so that the cooling zone volume surrounding it is rounded at the bottom by the removal mechanism 5, at the top by the horizontal boundary with a gap 10 in the vicinity of the upper face and externally by the inclined or vertical, cylindrical or rectangular sidewalls 9, is such that, based on the daily production, there is a cooling zone loading of 3 to 6 t/m³. This value varies as a function of the particle belt. Depending on the shaft size, gap 10 can be 1.5 to 4.0 m.

Utilizing the aforementioned conditions, extremely low residual $CO_2$ values can be obtained in the burned lime. As can be seen from the following list of lime samples from a two shaft furnace on two successive days, in many samples it was not possible to analytically detect any residual $CO_2$ content or only traces thereof were found.

|  | Time | Residual CO$_2$ Shaft I | Residual CO$_2$ Shaft II |
| --- | --- | --- | --- |
| 1st day | 6.00 | 0 | 0.04 |
|  | 7.00 | 0.06 | 0.14 |
|  | 9.00 | 0.31 | 0 |
|  | 10.00 | 0.67 | 0.08 |
|  | 12.00 | 0 | 0.67 |
|  | 14.00 | 0 | 0 |
|  | 16.00 | 0 | 0 |
|  | 18.00 | 0.03 | 0 |
|  | 20.00 | 0.03 | 0 |
|  | 22.00 | 0 | 0 |
|  | 24.00 | 0.58 | 0.60 |
| Daily average |  | 0.15 | 0.14 |
| 2nd day | 2.00 | 0.28 | 0.37 |
|  | 4.00 | 0.15 | 0 |
|  | 6.00 | 0.33 | 0.8 |
|  | 8.00 | 0.10 | 0.24 |
|  | 10.00 | 0.06 | 0.16 |
|  | 12.00 | 0.41 | 0.26 |
|  | 14.00 | 0 | 0 |
|  | 16.00 | 0 | 0 |
|  | 18.00 | 0.04 | 0 |
|  | 20.00 | 0.09 | 0.17 |
|  | 22.00 | 0 | 0.10 |
|  | 24.00 | 0.36 | 0.84 |
| Daily average |  | 0.15 | 0.19 |

If the sidewalls of cooling zones K slope inwards, it is advantageous to give them a slope α of max. 11°.

The fitting of the displacer 6 does not involve any modification of the removal mechanism 5. The air introduced through the steel pipe 7 also ensures an adequate cooling of displacer 6. For this puropose, at the lower end of displacer 6, laterial openings 12 are made in steel pipe 7. The steel pipe 7 is supported on the shaft foundation by webs 13.

The displacer 6 can be formed as cylindrical body, e.g. as hollow steel body. The outer surface of this body is covered by a layer or wall of refractory material.

What is claimed is:

1. In a regenerative shaft furnace for burning carbonate-containing raw materials with two or more shafts, the walls of which form cooling zones therein, interconnected by ducts which operate in an alternating manner so that one shaft operates as the burning or parallel flow shaft and the other as the counterflow shaft wherein the burned raw material is cooled in the cooling zones of the shafts, the improvement which comprises said furnace having a displacer fitted into the cooling zone of each shaft, said displacer being arranged in the center of each shaft, and wherein the cooling zone loading, determined as a quotient of the production of burned raw material each day and the volume of the cooling zone of the shafts, is 3 to 6 t/m$^3$.

2. A shaft furnace according to claim 1 wherein the walls of the cooling zone have a slope of max. 11°.

3. A shaft furnace according to claim 1 wherein the displacer has an upper face which is positioned in a temperature range in which the burned raw material has a temperature of at least 840° C.

4. A shaft furnace according to claim 1 wherein the upper face of the displacer and the lower end of the brickwork of the burning zone form a gap of at least 1.5 m.

5. A shaft furnace according to claim 4 wherein the gap between the upper face of the displacer and the lower end of the brickwork of the burning zone is max. 4.0 m.

6. A shaft furnace according to claim 1 wherein the upper face of the displacer and the lower end of the brickwork of the burning zone form a gap of max. 4.0 m.

7. A shaft furnace according to claim 1 wherein the displacer is supported on a pipe provided with lateral openings for cooling medium supply.

8. In a method for burning carbonate-containing raw materials in a shaft furnace containing two or more shafts interconnected by ducts wherein the raw material is introduced into the top of one of said shafts, is preheated, burned to expel CO$_2$ cooled in a cooling zone and removed from the bottom of the shaft and the shafts operate alternatively as the burning or parallel shaft and the other as the counterflow shaft, the improvement which comprises the cooling zone of each of the shafts having a displacer therein, said displacer being arranged in the center of each shaft, and wherein the cooling zone loading, determined as a quotient of the production of burned raw material each day and the volume of the cooling zone of the shafts, is 3 to 6 t/m$^3$.

* * * * *